(12) United States Patent
Schlieski et al.

(10) Patent No.: US 8,437,620 B2
(45) Date of Patent: May 7, 2013

(54) SYSTEM, METHOD, AND COMPUTER PROGRAM PRODUCT FOR CUSTOM STREAM GENERATION

(75) Inventors: Tondra Schlieski, Hillsboro, OR (US); Keith Bell, Hillsboro, OR (US); Delia Grenville, Portland, OR (US); Wayne W. Waterman, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 243 days.

(21) Appl. No.: 12/718,057

(22) Filed: Mar. 5, 2010

(65) Prior Publication Data

US 2011/0217024 A1 Sep. 8, 2011

(51) Int. Cl.
*H04N 5/93* (2006.01)
*H04N 9/80* (2006.01)
*G11B 27/00* (2006.01)

(52) U.S. Cl.
USPC ........... 386/278; 386/239; 386/241; 386/248; 386/262; 386/281

(58) Field of Classification Search .......... 386/239–248, 386/278–290
See application file for complete search history.

(56) References Cited

U.S. PATENT DOCUMENTS

| 7,096,486 | B1 * | 8/2006 | Ukai et al. | 725/58 |
| 2003/0093790 | A1 * | 5/2003 | Logan et al. | 725/38 |
| 2004/0244030 | A1 * | 12/2004 | Boyce et al. | 725/25 |
| 2006/0075454 | A1 * | 4/2006 | Jung et al. | 725/135 |
| 2008/0199150 | A1 * | 8/2008 | Candelore | 386/95 |
| 2009/0210892 | A1 * | 8/2009 | Ramaswamy | 725/9 |

FOREIGN PATENT DOCUMENTS

CN 1468492 A 1/2004

OTHER PUBLICATIONS

Office Action Received for Chinese Patent application No. 201110060552.8, mailed on Aug. 3, 2012, 6 pages of Office Action and 5 pages of English Translation.

* cited by examiner

*Primary Examiner* — Thai Tran
*Assistant Examiner* — Hung Dang
(74) *Attorney, Agent, or Firm* — Garrett IP, LLC

(57) ABSTRACT

Methods, systems, and computer program products that filter available content, produce a set of clean, discrete clips, and mix the clips to produce a package of content that matches a user's substantive preferences and conforms to a length and format specified by the user. Clips that do not match the user's preferences may be eliminated from use, as may be clips that have been viewed by the user previously. Moreover, the user can react to the received clips and judge them as to desirability and relevance to his or her preferences. These reactions may then become part of a user's set of preferences for generation of subsequent mixes.

20 Claims, 6 Drawing Sheets

SYSTEM, METHOD, AND COMPUTER PROGRAM PRODUCT FOR CUSTOM STREAM GENERATION

BACKGROUND

The vast quantity of information available daily, be it news, entertainment, or information related to a particular public event, like a sporting event, may overwhelm the intake capacity of consumers. Out of the thousands of hours of content available, it is only possible to consume a small portion.

Existing solutions fail to solve this problem. Historically, there have been two approaches. Pre-cut summaries (e.g., the evening news, sports wrap-ups) are sometimes produced, but fail to reflect the priorities and interests of the individual consumer. Alternatively, customized news delivery is now possible, using technologies such as really simple syndication (RSS) feeds, where a user may customize the set of sources that present information to the user. An example of this is the customizable iGoogle home page, which can deliver content based on user interest, but may fail to constrain the stream to a consumable volume. Moreover, the RSS approach requires user interaction with each individual source and content segment. The user must select a source and evaluate a particular video clip, for example, before deciding to watch it.

BRIEF DESCRIPTION OF THE DRAWINGS/FIGURES

DETAILED DESCRIPTION

A preferred embodiment is now described with reference to the figures, where like reference numbers indicate identical or functionally similar elements. Also in the figures, the leftmost digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the description. It will be apparent to a person skilled in the relevant art that this can also be employed in a variety of other systems and applications other than what is described herein.

Disclosed herein are methods, systems, and computer program products that may filter available content, produce a set of clean, discrete audio or video clips, and mix the clips to produce a package of content that matches a user's substantive preferences and conforms to a length and format specified by the user. Clips that do not match the user's preferences may be eliminated from use, as may be clips that have been viewed by the user previously. Moreover, the user can react to the received clips and explicitly or implicitly judge them as to desirability and relevance to his or her preferences. These reactions may then become part of a user's set of preferences for generation of subsequent mixes.

Figure 1:
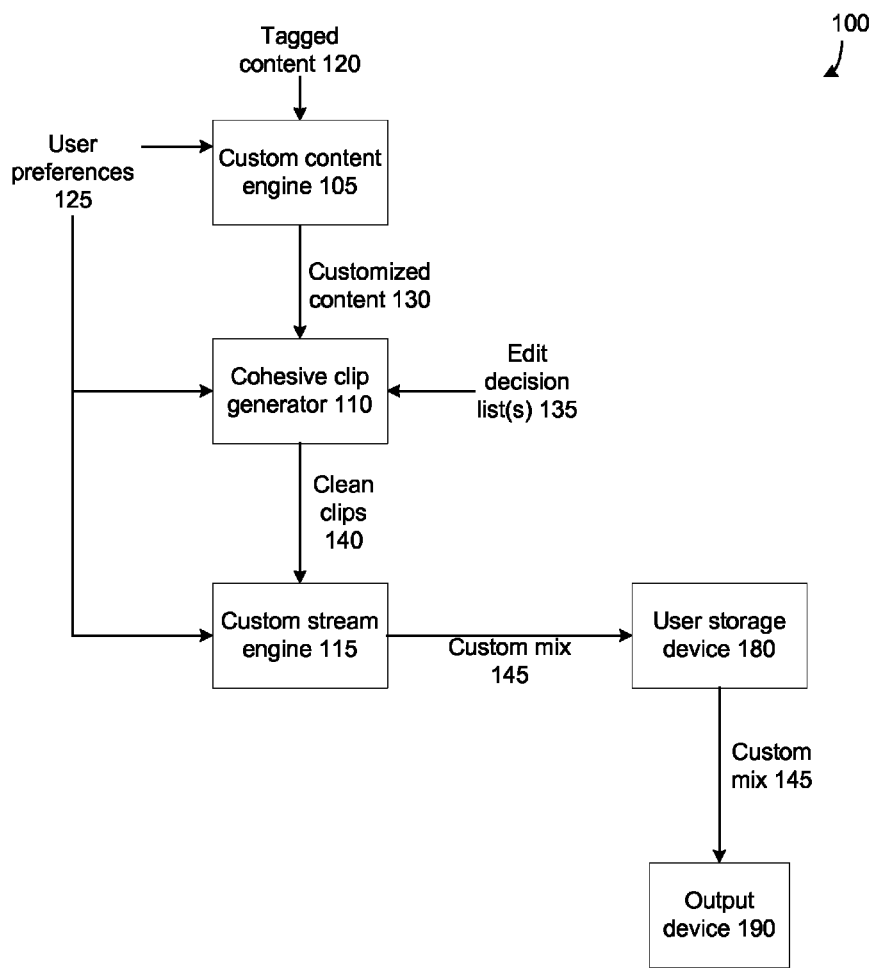
FIG. 1 is a block diagram illustrating components of an embodiment.

FIG. 1 illustrates a system that may produce such a mix for a user. A custom content engine 105 accepts a body of tagged content 120 from one or more sources. In an embodiment, the tagged content 120 may be video data. Alternatively or in addition, the tagged content may include audio data. The tagged content 120 may come from a news outlet or other source. The tagged content 120 may include television programs, sports events, or other news or entertainment content. The content 120 may be tagged according to the observed preferences of consumers in general, to indicate how relevant or popular the content may be. Content that features a particular athlete may be generally more popular than content that does not feature this person, for example. Content that features this athlete may therefore be tagged appropriately. In an embodiment, such a tag may be a numerical score indicative of the historical popularity of such content.

The custom content engine 105 may then apply the user's preferences 125 to the tagged content 120, to yield content that is customized for the particular user. In an embodiment, the user's preferences 125 may have been previously chosen by the user through a menu driven interface and may be modeled and stored as one or more vectors, as will be discussed below. Such preferences may be seen as a profile of the user for purposes of customizing content for the user. In an embodiment, the profile may also include demographic information, e.g., gender, age, and income level of the user. In an embodiment, the profile of a user may be stored and maintained by a content provider.

The output of custom content engine 105 includes customized content 130. Customized content 130 may represent the universe of content that may appeal to the user, based on the user's expressed preferences 125. If a user prefers content featuring the Seattle Seahawks and dislikes content featuring the Dallas Cowboys, then customized content 130 may include content featuring the Seahawks, and none featuring the Cowboys, for example. If the user prefers baseball but dislikes soccer, content featuring soccer may be eliminated, for example. Additional description of the operation of the custom content engine 105 is provided below.

Customized content 130 may then be passed to cohesive clip generator 110. The cohesive clip generator 110 may take customized content 130 and decompose it into a set of discrete clips. This decomposition process is known in the art, and may take advantage of a variety of features in the customized content 130 that can be used to discern the boundaries or "edges" of clips. These indicators may include one or more of the following:

Advertising splice points
Flash frames
Graphics associated with introductions or closings
Closed caption text
On-screen text
Musical cues
Audio cues Advertising splice points may represent points in content where advertising is inserted. Such splice points may therefore be used as indicators for the beginning or ending of a segment that may be treated as a discrete clip. Similarly, a single blank frame, sometimes called a flash frame or full white field, may be used by editors as a transition between scenes. Such a field may be used as an indicator for the beginning or ending of a clip.

Graphics that are part of the content may also be used to indicate the start or ending of a clip. A baseball broadcast may show a network logo at the end of every inning, for example. This could serve as an indicator of the end of a clip. Closed caption text may also be used to indicate the start or end of a clip. If closed caption text says, "Here's Derek Jeter coming to the plate", this could signify the beginning of video showing an at-bat by Derek Jeter, and may therefore indicate a valid starting point for a clip. Closed caption text that reads, "Jeter strikes out" could likewise indicate the end of the clip. Other on-screen text may also serve this purpose. A graphic that shows a batter's batting average may indicate the beginning of video showing an at-bat for the player, and could therefore be used to determine the start of a clip.

Clip edges could also be determined using audio cues. For example, a broadcaster may say, "We'll be right back" when going into a commercial break, and "Welcome back" when returning from the commercial break. Such audio cues could serve as indicators for the beginning and ending of a clip. Similarly, music may be used by producers to begin or end a broadcast segment. Music may therefore be used as indicators of clip edges.

Finally, one or more edit decision lists (EDLs) may be provided to cohesive clip generator 110. Such a list may be obtained from a content provider, and may consist of an ordered list of reel (or frame sequence) and timecode data that represents film or video edits in a segment of content. Such a listing of edit points may also be used to determine the edges of clips.

Note that the set of indicators and EDLs may not definitively indicate an edge. The result of considering all the indicators may lead to conflicting conclusions about the location of an edge. In an embodiment, the decision regarding the location of an edge may require the definition of a threshold value, where an edge is assumed to exist only if some threshold number of indicators or tests suggests a location for an edge.

Once clip edges are determined, discrete clips may be identified. Clips having well-defined edges (i.e., edges indicated by a significant number of agreeing indicators) may also be referred to herein as clean clips. In an embodiment, management information may be added to each clip. Such management information may include the length of the clip, the date and time of events depicted in the clip, and the storage location of the clip. In an embodiment, the storage location may be a server path at the content provider's facility. Such information may be used by the custom stream engine 115, as will be described below.

Moreover, the user's preferences 125 may also be applied to the clean clips. Here, each clip may be graded according to the user's preferences 125, in order to create a metric that denotes how closely the clip meets the user's preferences 125. In an embodiment, the metric may be a numerical value. The clips, including their grades and management information, may then be output as clean clips 140. Additional description of the operation of the cohesive clip generator 110 is provided below.

Clips 140 may then be received by custom stream engine 115. This module applies a series of tests to the received clips 140 to filter out clips that may be less desirable for one or more reasons. Such clips may then be excluded from the eventual custom mix 145. For example, clips that have been previously viewed may be eliminated. Clips that bear some similarity to a clip that has been previously viewed but disliked by the user may be eliminated. Clips that do not agree with the user's preferences 125 may be eliminated, where the level of agreement may be determined using the grade or metric developed by the cohesive clip generator 110 and described above.

The remaining clips may then be combined into custom mix 145, bearing in mind the logistical constraints imposed by the user, as stated in the user's preferences 125. While some of the user's preferences 125 may be substantive (e.g., preferred topics, preferred sports, teams, or personalities), other preferences may be logistical. The user may prefer a custom mix lasting 30 minutes for example, to be delivered daily; the user may instead (or in addition) prefer a 60 minute custom mix, delivered weekly. In the world of sports, the user may prefer to see an entire game instead of highlights, regardless of the duration of the game. Such preferences are more logistical than substantive, in that they may concern the packaging and delivery of the mix, rather than the substance of the content. In light of such logistical preferences, the custom stream engine 115 must also work within the bounds of these preferences. The logistical preferences may require that older clips be eliminated, for example, or that clips failing to meet all the substantive requirements be eliminated. In addition, in an embodiment, clips that have proven to be less popular with other viewers may be eliminated.

Another factor affecting which clips may be eliminated is the size of the population of possible clean clips 140. A large set may mean that only the clips that most closely match the substantive preferences will be kept, given the logistical preferences, or that only the newest clips may be kept. Additional description of the operation of the custom stream engine 115 is provided below.

The output of the custom stream engine 115 may then include a custom mix 145, which may be delivered to a user storage device 180 local to the user. Storage device 180 may be any device that can store a custom mix 145, and may be, for example, a hard drive in a set-top box or a personal computer. Alternatively, user storage device 180 may be incorporated in a mobile media device, such as a smartphone. Delivery of the custom mix 145 to the storage device 180 may be through any means known to persons of skill in the art, including wired or wireless communications systems, wire or fiber cable communications systems, and/or local or wide area data networks, e.g., the Internet, or any combination thereof. In an alternative embodiment, the user storage device 180 may be remote from the user, such as a server accessible through a data network.

The custom mix 145 may then be accessed from the user storage device 180 and viewed through an output device 190. The output device 190 may be a monitor and/or an audio system connected to a personal computer of the user, for example, or may be a television connected to a set-top box.

In various embodiments, the user may have several options for how to view the custom mix 145. The user may simply play the mix from start to finish; alternatively, the user may pick and choose which clips to view, and the order in which they are viewed. In an alternative embodiment, the user may be given the option of viewing a brief segment of each clip, in place of viewing the entire clip, or as a way of deciding whether to view the entire clip.

In addition, in an embodiment, the user's reaction to each clip may be recorded. Reactions may be explicitly stated by the user in the form of a response to an on-screen questionnaire, for example. Here, a user may indicate that he or she liked or disliked a clip. Reactions may also be implicit—a user may choose to ignore a clip, or may choose to view a clip multiple times. In any event, reactions may be recorded by a content provider and may be used to modify the user's substantive preferences. If a user initially expressed an interest in hockey, but repeatedly ignores hockey clips in custom mixes, this fact will be noted. The user's profile may then be changed to lessen the user's recorded interest in hockey.

Note that any of custom stream engine 115, cohesive clip generator 110, and custom content engine 105 may be implemented in hardware, firmware, or software, or a combination thereof. Various implementations may including discrete and integrated circuit logic, application specific integrated circuit (ASIC) logic, and microcontrollers, and may be implemented as part of a domain-specific integrated circuit package, or a combination of integrated circuit packages. The term software, as used herein, refers to a computer program product including a computer readable medium having computer program logic stored therein to cause a computer system to perform one or more features and/or combinations of features disclosed herein. Moreover, custom stream engine 115, cohesive clip generator 110, and custom content engine 105 may be operated and maintained by a content provider, according to an embodiment.

Figure 2:
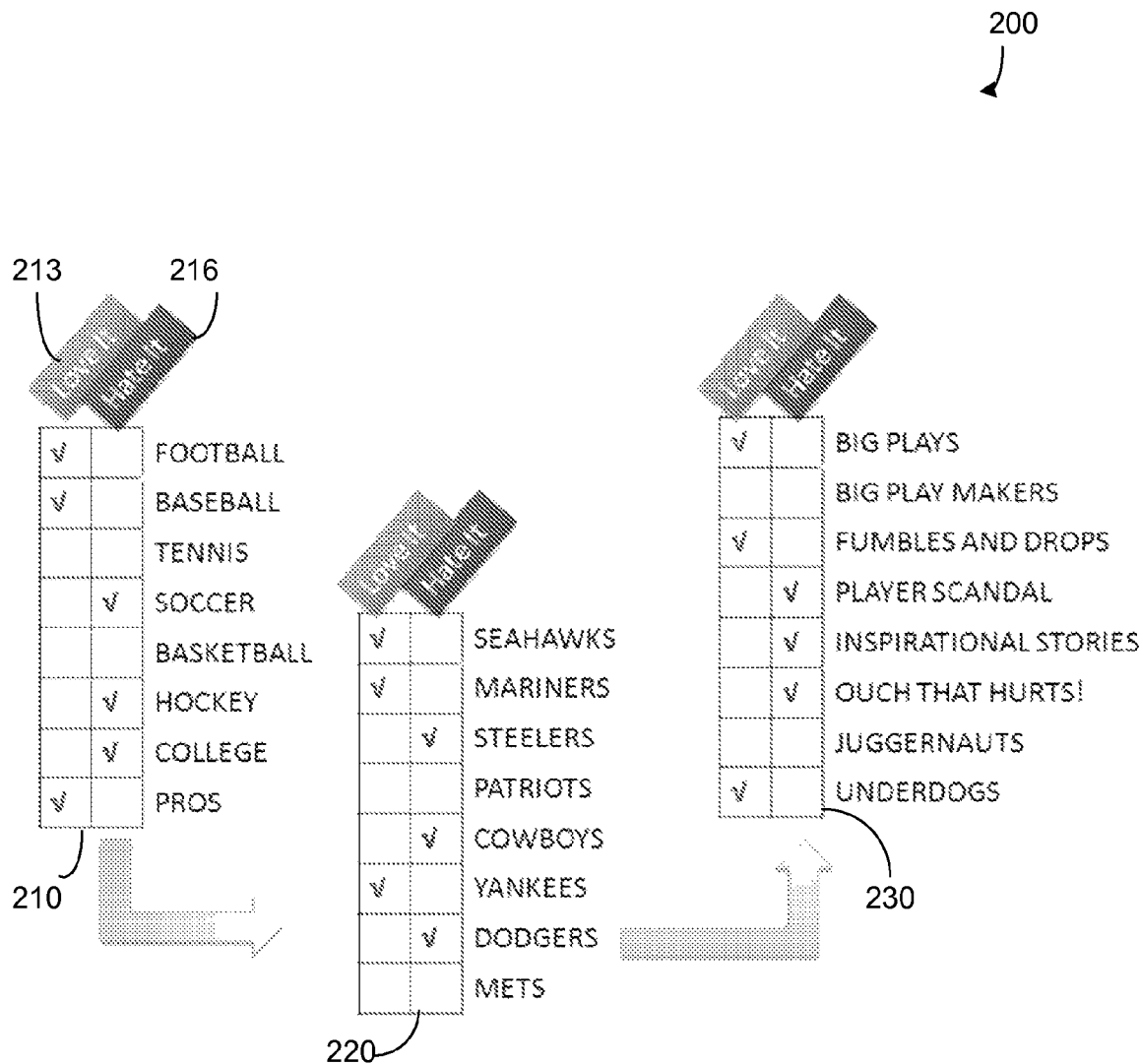
FIG. 2 illustrates a user interface through which a user may express substantive preferences according to an embodiment.

FIG. 2 illustrates a set of related menus that a user may use in order to input user preferences 125, according to an embodiment. In this example, the user may be presented with options relating to sports-related content. The menus may be provided by a content provider, such as a television network or other media outlet, and may be provided through a website of the provider, or as a graphical user interface that appears on the user's television in the context of an interactive television system.

Menu 210 may be used as the first menu to be accessed by the user in the illustrated embodiment. Here the user may be asked to identify sports in which he or she is interested. For each sport, the user may express interest by checking the "Love It" column 213. Dislike may be indicated by checking the "Hate It" column 216. A user also has the option, in this example, of checking neither column if the user has no strong opinion.

Based on the selections made in the first menu 210, the user may be presented with one or more additional menus 220. In this example, an interest in professional sports, baseball, and football has led to the presentation of menu 220, which allows the user to express interest or disinterest in particular professional baseball and football teams. In light of the user's selections in menu 210, no menu would be presented for professional hockey or soccer teams.

While menus such as menus 210 and 220 may allow a user to express substantive preferences for content relating to specific topics, menu 230 may allow the user to express substantive preferences for content having specific themes or tones. Here, the user has a preference for content showing big plays, fumbles and drops, and underdogs, and disinterest in content relating to player scandals, for example. Given the user's choices in menus 210, 220, and 230, the user is saying that he or she would like to see big plays made by the Seahawks, for example, but would have no interest in seeing inspirational stories regarding the Steelers. The user's feelings about player scandals among the Seahawks is more ambiguous, given the user's interest in the Seahawks but explicit dislike of content regarding player scandal, for example. In an embodiment, such a case may be assigned an intermediate level of interest, given this ambiguity.

The interests of a user may be modeled and stored as a set of vectors in an embodiment, where each coordinate in a vector may correspond to a topic or tone. The entry for each coordinate may be binary, as suggested by the menus of FIG. 2. In alternative embodiments, the value for each coordinate may not be binary, but may instead be a real or integer value, where the magnitude of the value corresponds to the level of interest in the topic or tone.

Figure 3:
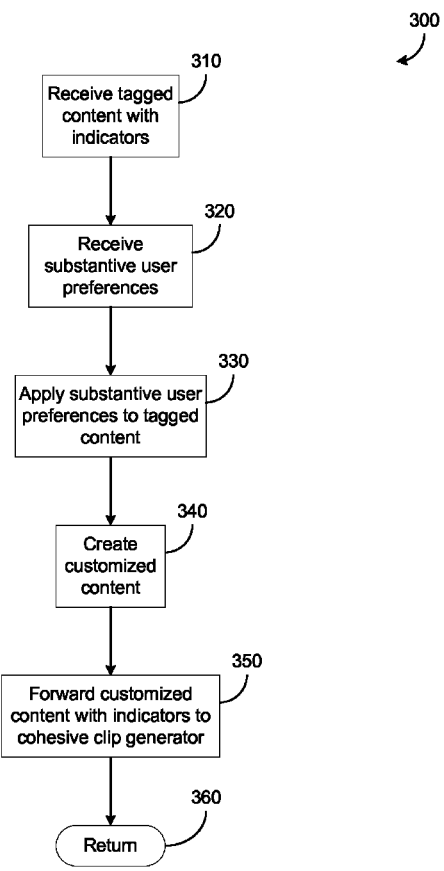
FIG. 3 is a flow chart illustrating operation of a custom content engine, according to an embodiment.

FIG. 3 illustrates the processing performed by custom content engine 105, according to an embodiment. At 310, the custom content engine may receive tagged content, including one or more of the indicators described above. In an embodiment, the tagged content may be received from a content provider. At 320, the user's substantive preferences may be received. At 330, the user's substantive preferences may be applied to the tagged content. In an embodiment, this may include eliminating content for which the user has expressed dislike. Note that the user's substantive preferences may not be expressed in a binary fashion, and may instead be expressed in relative degrees of like or dislike. In this case, a threshold value of like or dislike may be defined and applied in deciding whether or not to eliminate content. In any event, the remaining content may represent the customized content created at 340. At 350, the customized content may be forwarded to the cohesive clip generator. The process may conclude at 360.

Figure 4:
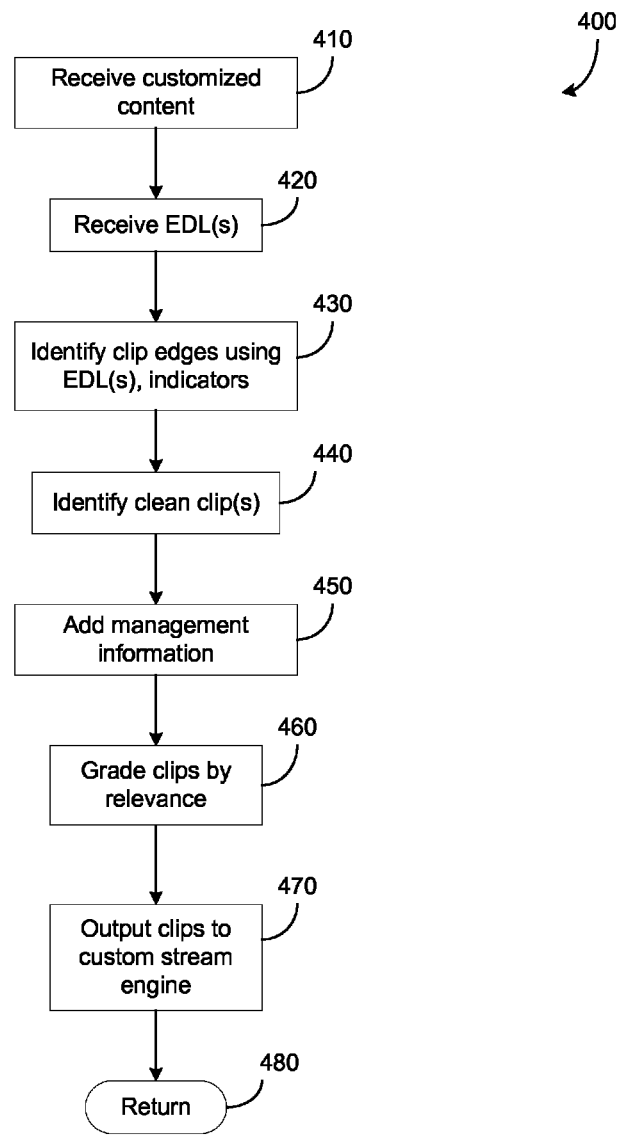
FIG. 4 is a flow chart illustrating operation of a cohesive clip generator, according to an embodiment.

FIG. 4 illustrates the processing at cohesive clip generator 110. At 410, the cohesive clip generator may receive the customized content from the custom content engine. At 420, the cohesive clip generator may receive one or more EDLs. In an embodiment, the EDLs may be received from the content provider(s). At 430, the cohesive clip generator may identify clip edges using the EDLs and the indicators in the customized content. The process of identifying clip edges using such information is described in U.S. Pat. Nos. 6,591,058 and 6,480,667, which are co-owned with the present application and incorporated herein by reference in their entireties. At 440, clean clips may be identified, given the identification of clip edges. As described above, the set of indicators and EDLs may not definitively indicate an edge. The result of considering all the indicators may lead to conflicting conclusions about the location of an edge. In an embodiment, the decision regarding the location of an edge may require the definition of a threshold value, where an edge is assumed to exist only if some threshold number of indicators or tests suggests a location for an edge.

At 450, management information may be appended to each clip. As discussed above, the management information may include the length of the clip, the date and time of events depicted in the clip, and a storage location of the clip. At 460, each clip may be graded by relevance. Here, the attributes of the clip may be compared to the substantive preferences of the user. Based on this comparison, an assessment may be made as to how closely each clip matches the substantive preferences of the user. The assessment may be used to grade each clip by relevance. At 470, the graded clean clips may be output to the custom stream engine. The process may conclude at 480.

In an embodiment, there may be certain clips that may be predefined and specified by a content provider, where such clips are assumed to be of interest to any user. An example might be video of a game-winning score in a championship game, for example. Such a clip would not have to have its edges determined, and would be automatically included in the set of clean clips output by the cohesive clip generator.

Figure 5:
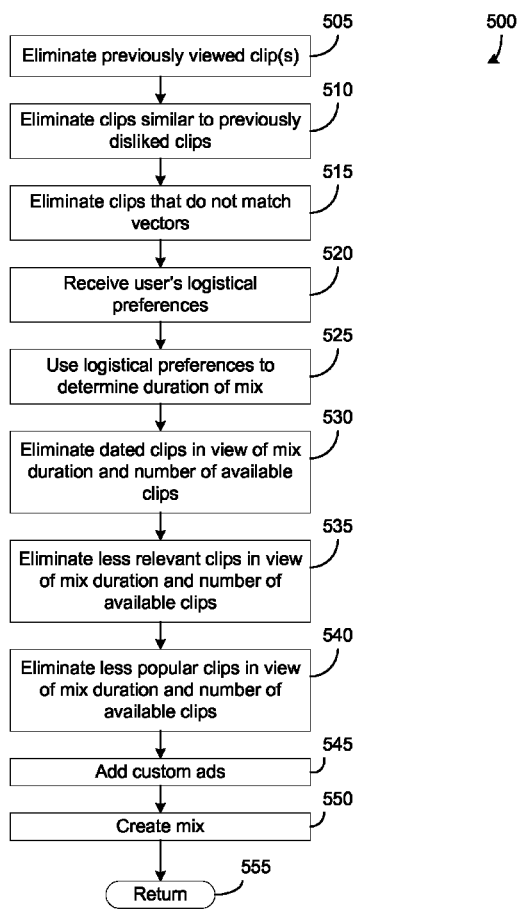
FIG. 5 is a flow chart illustrating operation of a custom stream engine, according to an embodiment.

FIG. 5 illustrates the processing performed at custom stream engine 115, according to an embodiment. At 505, clips that have been previously viewed by the user may be eliminated from inclusion in the ultimate custom mix. At 510, the remaining clips may be reviewed to see if any may be similar in tone and/or topic to clips that have been previously viewed and disliked by the user. Recall that after viewing a clip, the user's reaction to the viewed clip may be recorded. At 510, such a reaction may be applied in the generation of a new mix, by seeing if any of the candidate clips may be similar to one that was previously viewed and disliked by the user. At 515, clips that do not match the substantive preferences of the user, as recorded in the associated vector(s), may be eliminated.

At 520, the user's logistical preferences may be received. As discussed above, these preferences may specify parameters such as the desired duration of a mix; whether the user prefers to see entire events or game, or merely highlights; and how frequently mixes area presented (e.g., daily, weekly, etc.). At 525, the logistical preferences may be used to define the duration of the eventual mix.

At 530-540, clips may be eliminated in view of the required duration of the mix and in view of the total number or remaining candidate clips. At 530, older clips may be identified and eliminated. In an embodiment, a threshold point in time may be defined, wherein clips for events that happened before the threshold point would be eliminated. The threshold point in time may be dependent on the total number of remaining clips. If there is a large population of remaining clips, it may be feasible to eliminate all but the newest clips. If the population of remaining clips is small, then the threshold point in time may be set to be more inclusive.

At 535, less relevant clips may be eliminated. Here, a similarity metric may be calculated that models the similarity between a given clip and the user's substantive preferences. A similarity threshold for this metric may be defined, such that if the similarity metric exceeds the similarity threshold, the clip may be kept; clips that with a similarity metric lower than the similarity threshold may be eliminated. Again, this threshold may be dependent on the total number of remaining clips. If there is a large population of remaining clips, it may be feasible to eliminate all but the most similar clips. If the population of remaining clips is small, then the similarity threshold may be set to be more inclusive.

At 540, less popular clips may be eliminated, where popularity may be gauged according to the reactions of other viewers to the clips. A popularity metric may be defined, based on the percentage of viewers who like a given clip, for example, as expressed in their recorded reactions to the clip. A popularity threshold may then be defined, where a clip whose popularity metric exceeds the popularity threshold may be kept, and a clip whose popularity metric is below the popularity threshold may be eliminated. Again, the popularity threshold may be dependent on the total number of remaining clips. If there is a large population of remaining clips, it may be feasible to eliminate all but the most popular clips. On the other hand, if the set of remaining clips is small, then the popularity threshold may be set to be more inclusive, so that marginally popular clips may be retained.

At 545, one or more advertisements may be added, according to an embodiment. Such ads may be customized according to the user's substantive preferences and whatever else may be known about the user, as reflected in the user's profile. If the user has expressed interest in a particular team, the ads may describe apparel bearing that team's logo, for example. If the user is known to be an adult male, then the ads may describe a product appropriate for an adult male, such as shaving products for example.

At this point, a set of clips remains, along with one or more customized ads. If the total time duration of these clips and ads exceeds the desired mix duration specified in the user's logistical preferences, then more clips may be eliminated. To do this, the threshold point in time, the similarity threshold, and/or the popularity threshold may be modified, so as to be more restrictive so as to eliminate more clips. Then the process may repeat some or all of 530-540.

Finally, once the requirements of the user's logistical preferences are met, then in 550 the custom mix may be constructed. In an embodiment, the construction of the custom mix may comprise the insertion of one or more transitional segments between clips. These transitional segments may include fades, black frames, or the like, where such transitional segments would serve to smooth the visual experience for the user. The process may conclude at 555.

In an embodiment, the custom mix may be manipulated even after delivery to the user storage device. For example, ads inserted at 545 above may be replaced with more timely ads. This would keep the advertising content relevant at the time the mix is viewed. This could be useful in the case of sales offers that are new, or that may have expired or are about to expire for example.

As noted above, the custom content engine, the cohesive clip generator, and the custom stream engine may be implemented in hardware, software, firmware, or some combination thereof. The term software, as used herein, refers to a computer program product including a computer readable medium having computer program logic stored therein to cause a computer system to perform one or more features and/or combinations of features disclosed herein.

Figure 6:
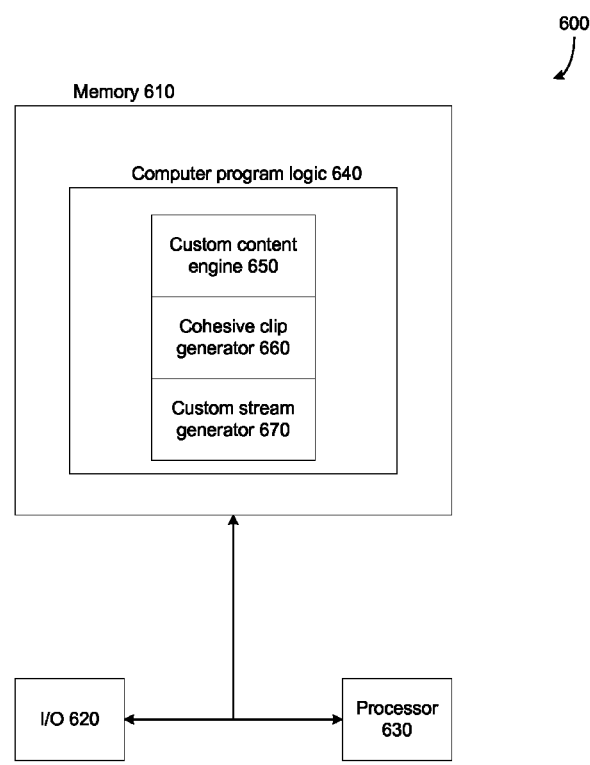
FIG. 6 illustrates a computing context of the system described herein, according to an embodiment.

A software or firmware embodiment of the processing described above is illustrated in FIG. 6. System 600 may include a processor 630 and a body of memory 610 that may include one or more computer readable media that may store computer program logic 640. Memory 610 may be implemented as a hard disk and drive, a removable media such as a compact disk and drive, or a read-only memory (ROM) device, for example. Processor 630 and memory 610 may be in communication using any of several technologies known to one of ordinary skill in the art, such as a bus. Logic contained in memory 610 may be read and executed by processor 630. One or more I/O ports and/or I/O devices, shown collectively as I/O 620, may also be connected to processor 630 and memory 610.

Computer program logic may include modules 650-670, according to an embodiment. As described above, the custom content engine 650 may accept tagged content and a user's substantive preferences and create customized content based on these substantive preferences. The cohesive clip generator 660 may convert the customized content into clean clips, append management information, and grade the resulting clips by relevance. The custom stream generator module may create the final mix by accepting the clips output by the cohesive clip generator, and eliminating some of the clips as necessary in order to comply with logistical preferences of the user.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the exemplary embodiments disclosed herein.

What is claimed is:

1. A system, comprising:
   a processor; and
   a memory in communication with said processor, wherein said memory stores a plurality of processing instructions configured to direct said processor to
   receive tagged content;
   produce content customized for a user in accordance with substantive preferences of the user;
   convert said customized content into clean clips that are graded according to the user's substantive preferences, wherein said conversion comprises identification of edges of clips using a plurality of indicators, such that conflicting indicators of a location of an edge are resolved by determining if a threshold plurality of indicators indicate a particular location;
eliminate a portion of said clips on the basis of predefined criteria; and
create a mix of remaining clips that conforms to logistical preferences and the substantive preferences of the user.

2. The system of claim 1, wherein said processing instructions configured to direct said processor to convert said customized content into clean clips comprise:
processing instructions configured to direct said processor to identify edges of clips using one or more of the following:
advertising splice points;
flash frames;
edit decision list (EDL) entries;
recognized graphical introductions and closings;
recognized musical cues;
closed caption text;
recognized audio cues; and
recognized on-screen text.

3. The system of claim 1, wherein said processing instructions further direct said processor to add one or more of the following to each clip:
the length of the clip;
the date and time of events depicted in the clip; and
a storage location of the clip.

4. The system of claim 1, wherein said processing instructions configured to direct said processor to eliminate a portion of said clips on the basis of predefined criteria comprise:
processing instructions configured to direct said processor to eliminate a clip on the basis of its dissimilarity to the user's substantive preferences.

5. The system of claim 1, wherein said processing instructions configured direct a processor to eliminate a portion of said clips on the basis of predefined criteria comprise:
processing instructions configured direct said processor to eliminate a clip on the basis of its similarity to a clip that was previously viewed and disliked by the user.

6. The system of claim 1, where said processing instructions configured to direct said processor to eliminate a portion of said clips on the basis of predefined criteria comprise:
processing instructions configured to direct said processor to eliminate a clip when there is insufficient time in the mix, as specified in the user's logistical preferences, for inclusion of the clip in said mix.

7. The system of claim 1, wherein said processing instructions configured to direct said processor to eliminate a portion of said clips on the basis of predefined criteria comprise:
processing instructions configured direct said processor to eliminate a clip when the clip has been previously viewed and disliked by one or more other users.

8. A method, comprising:
receiving tagged content;
producing content customized for a user in accordance with substantive preferences of the user;
converting the customized content into clean clips that are graded according to the user's substantive preferences, wherein said conversion comprises identification of edges of clips using a plurality of indicators, such that conflicting indicators of a location of an edge are resolved by determining if a threshold plurality of indicators indicate a particular location;
eliminating a portion of the clips on the basis of predefined criteria; and
creating a mix of remaining clips that conforms to logistical preferences and the substantive preferences of the user.

9. The method of claim 8, wherein said converting of customized content into clean clips comprises identifying edges of clips using one or more of the following:
advertising splice points;
flash frames;
edit decision list (EDL) entries;
recognized graphical introductions and closings;
recognized musical cues;
closed caption text;
recognized audio cues; and
recognized on-screen text.

10. The method of claim 8, further comprising:
receiving an indication of the user's reaction to a viewed clip; and
modifying the user's substantive preferences in accordance with the reaction.

11. The method of claim 8, wherein said eliminating of a portion of the clips comprises eliminating a clip on the basis of its dissimilarity to the user's substantive preferences.

12. The method of claim 8, wherein said eliminating of a portion of the clips comprises eliminating a clip on the basis of its similarity to a clip that was previously viewed and disliked by the user.

13. The method of claim 8, wherein said eliminating of a portion of the clips comprises eliminating a clip when the clip has been previously viewed and disliked by one or more other users.

14. A computer program product, including a computer readable non-transitory storage medium having computer program logic stored therein, the computer program logic comprising:
logic to cause a processor to receive tagged content;
logic to cause the processor to produce content customized for a user in accordance with substantive preferences of the user;
logic to cause the processor to convert the customized content into clean clips that are graded according to the user's substantive preferences, wherein the conversion comprises identification of edges of clips using a plurality of indicators, such that conflicting indicators of a location of an edge are resolved by determining if a threshold plurality of indicators indicate a particular location;
logic to cause the processor to eliminate a portion of the clips on the basis of predefined criteria; and
logic to cause the processor to create a mix of remaining clips that conforms to logistical preferences and the substantive preferences of the user.

15. The computer program product of claim 14, wherein said logic to cause the processor to convert the customized content into clean clips comprises logic to cause the processor to identify edges of clips using one or more of the following:
advertising splice points;
flash frames;
edit decision list (EDL) entries;
recognized graphical introductions and closings;
recognized musical cues;
closed caption text;
recognized audio cues; and
recognized on-screen text.

16. The computer program product of claim 14, further comprising logic to cause the processor to add one or more of the following to each clip:
the length of the clip;

the date and time of events depicted in the clip; and a storage location of the clip.

17. The computer program product of claim 14, wherein said logic to cause the processor to eliminate a portion of the clips comprises logic to cause the processor to eliminate a clip on the basis of its dissimilarity to the user's substantive preferences.

18. The computer program product of claim 14, wherein said logic to cause the processor to eliminate a portion of the clips comprises logic to cause the processor to eliminate a clip on the basis of its similarity to a clip that was previously viewed and disliked by the user.

19. The computer program product of claim 14, wherein said logic to cause the processor to eliminate a portion of the clips comprises logic to cause the processor to eliminate a clip when the clip has been previously viewed and disliked by one or more other users.

20. The computer program product of claim 14, further comprising logic to cause the processor to receive an indication of the user's reaction to a viewed clip; and logic to cause the processor to modify the user's substantive preferences in accordance with the reaction.

* * * * *